United States Patent [19]
Setele

[11] 3,710,906
[45] Jan. 16, 1973

[54] RATCHET DRIVE MECHANISM
[75] Inventor: William O. Setele, Independence, Ohio
[73] Assignee: Kendale Industries, Inc.
[22] Filed: Sept. 30, 1971
[21] Appl. No.: 185,081

[52] U.S. Cl...................................192/46, 192/64
[51] Int. Cl.............................................F16d 41/00
[58] Field of Search......................192/46, 64; 64/29

[56] References Cited

UNITED STATES PATENTS

| 2,078,781 | 4/1937 | Sprenger et al | 192/46 X |
| 2,145,083 | 1/1939 | Dynes | 64/29 |
| 2,400,818 | 5/1946 | Gallagher | 192/46 |
| 2,410,971 | 11/1946 | Hartley | 64/29 UX |
| 2,571,669 | 10/1951 | Boyce et al. | 64/29 X |
| 2,589,383 | 3/1952 | Holt | 192/46 UX |
| 2,596,604 | 5/1952 | Schaeffer | 192/46 UX |

Primary Examiner—Allan D. Herrmann
Attorney—Woodling, Krost, Granger and Rust

[57] ABSTRACT

A ratchet drive mechanism for obtaining a positive drive of a driven member in one rotative direction of the driving member and an idle or free-wheeling condition of the driven member in an opposite rotative direction of the driving member. The mechanism including a ball bearing is self-contained to be mounted as a unit in the hub of a driven member such as a wheel and upon a driving member such as a shaft. It is particularly adapted for use in such driven apparatus as in the front wheel of a child's tricycle. This is an abstract only of the specific illustration of the invention given by way of example, and is not to be used in the interpretation of the claims nor as a limitation on the scope of the invention.

10 Claims, 6 Drawing Figures

PATENTED JAN 16 1973 3,710,906

INVENTOR.
WILLIAM O. SETELE
BY
ATTORNEYS.

RATCHET DRIVE MECHANISM

An object of my invention is to provide an efficient and economical ratchet drive mechanism of simple and sturdy construction.

Another object is the provision of an improved ratchet drive mechanism including a ball bearing assembly mountable as a unit in the hub of a driven member such as a wheel and upon a driving member such as a shaft.

Another object is the provision of a unit constructed for ready insertion in the hub of a wheel and upon a driving shaft in the hub, including both ratchet driving means and bearing means.

Other objects and a fuller understanding of this invention may be had by referring to the following description and claims taken in conjunction with the accompanying drawings, in which:

Figure 1:
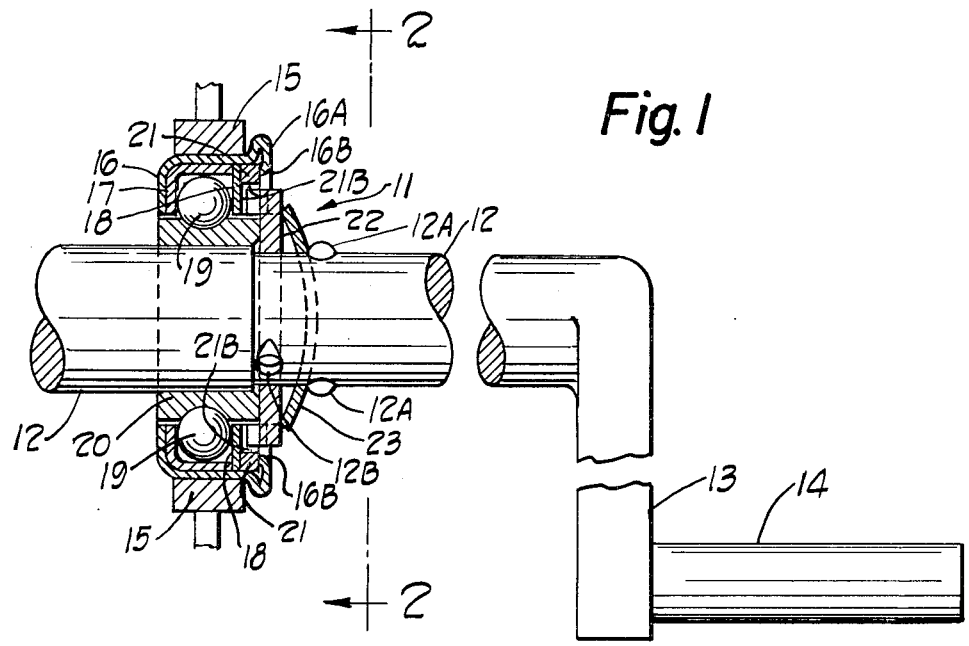
FIG. 1 is a longitudinal sectional view of a mechanism embodying my invention mounted in the hub of a wheel on a driving shaft, such as the driving shaft of a tricycle.

The assembly of my ratchet drive mechanism, including a bearing assembly, is denoted generally by the reference character 11 in the drawing. The complete unit is made up of the ratchet drive mechanism, including a ball bearing assembly, as shown mounted in the hub of a wheel or driven member 15, a portion of which is shown in FIG. 1.

The unit is mounted upon a driving member or shaft 12 which extends axially through the unit within the hub of the wheel. As a typical and illustrative use of my mechanism is its use in the front wheel of a child's tricycle driven by a shaft 12 having crank arms 13 at its opposite ends, carrying pedals 14, I show the unit assembled on such a shaft in such a wheel in FIG. 1.

The unit includes a cup-shaped metal shell 16 formed as shown with a rim portion 16A extending therearound at one end of the shell. The other end of the shell 16 is curved inwardly as illustrated.

Mounted within the shell 16 is a ball bearing assembly. This assembly has an outer race made up of a first or cup portion 17 and a second or disk portion 18. The outer race made up of portions 17 and 18 accommodate therein a plurality of steel balls 19 in the usual manner. The balls 19 extend circumferentially around and are accommodated in an inner race 20. This inner race 20 is keyed or splined on the shaft 12. Thus the unit is mounted on the shaft 12 by means of the ball bearing assembly as shown and described.

Figures 4, 5, 6:
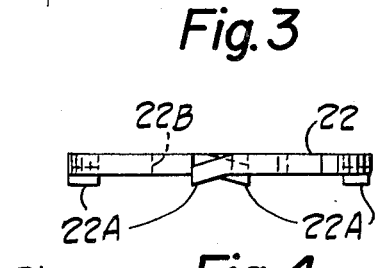
FIG. 4 is an edge view of the said male ratchet drive element looking in the direction of the arrows 4—4 of FIG. 3.
FIG. 5 is a plan view of the female ratchet drive element of my mechanism shown removed from the assembly.
FIG. 6 is an edge view of the said female ratchet drive element looking in the direction of the arrows 6—6 of FIG. 5.

Mounted within the shell 16 next adjacent to the disk portion 18 is a female ratchet drive element 21. The form and construction of the element 21 is better shown in FIGS. 5 and 6 wherein it is removed or separate from the assembly. The female element 21 has four spurs or barbs 21A formed therein adjacent its outer circumferential extent and on the forward face of the element 21. These spurs or barbs 21A are formed by lancing and upsetting metal at the four spaced locations. The cut or free edges of the spurs or barbs 21A form abrupt abutting surfaces extending out from the forward surface of the element 21.

The rim 16A of the shell 16 is peened inwardly in the assembling of the unit whereby metal at the four locations indicated by the reference character 16B are peened over and about the spurs or barbs 21A. Peening over of the metal rim at locations 16B about the spurs or barbs 21A interlock the female element 21 against rotative movement relative to the shell 16. Thus the peening over of the rim 16A not only secures the female element 21 and the disk portion 18 and cup portion 17 within the shell 16 but also interlocks the female element 21 against rotative movement relative to the shell 16.

The female element 21 as seen in the drawing also has four equi-distantly spaced notches or recesses 21B. These notches 21B are formed by metal cut away from the element 21 and have abrupt side edges as illustrated. The notches 21B extend radially outward of central opening 21C which opening accommodates the inner race 20 therein at that end of the assembly.

Figures 2, 3:
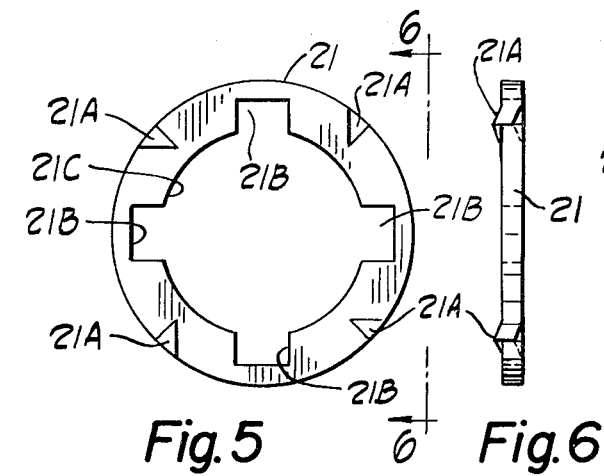
FIG. 2 is a cross-sectional view of my mechanism looking in the direction of the arrows 2—2 of FIG. 1.
FIG. 3 is a plan view of the male ratchet drive element of my mechanism shown removed from the assembly.

A male ratchet drive element 22 is mounted on and in axial alignment with the shaft 12. The male element 22 is shown removed or separated from the assembly in FIGS. 3 and 4. The male element 22 has a bore or central opening 22B through which extends the shaft 12. Two slots 22C at diametrically opposed locations are provided in the male element 22 and extend from the bore 22B. The male element 22 is splined or keyed to the shaft 12 by means of two ears 12B upset from and extending radially outward of the shaft 12 into the slots 22C. By this arrangement the male element 22 may move axially of the shaft 12 but is caused to rotate with the shaft 12.

The male ratchet drive element 22 has four off-set teeth equi-distantly spaced apart around its circumferential extent and protruding outwardly from a face of the element 22. These teeth 22A are directed toward the female element 21 in such a manner that the teeth 22A may interfit in the notches 21B and drivingly engage the side edges of the respective notches 21B. Each tooth 22A is formed by lancing the metal of the element 22 and upsetting the metal as indicated to form the tooth extending outwardly from the plane of the face of the element 22 directed toward the female element 21. As seen in the drawing the teeth 22A are each formed by two cuts in the metal of the element 22 and thereupon bending the small segment formed by the two cuts so as to incline the segment at an angle to the plane of element 22. As seen in the drawing, the teeth 22A have an inclined surface and an abrupt surface. Upon rotation of the male element in one rotative direction the abrupt surface is disposed to engage a side edge of a notch 21B in the female element 21. However, upon rotation of the male element 22 in an opposite rotative direction the inclined surface tends to ride up in a camming manner over the edge of a notch 21B so as to become disengaged from the respective notch 21B. The cooperation and arrangement of the male and female elements of other ratchet drive mechanisms are well known and the arrangement and action of the male and female drive elements 21 and 22 of my mechanism will be well understood.

A spring washer 23 is mounted upon the shaft 12 next adjacent the male element 22 so as to bear thereagainst. Abutting means is provided by ears 12A upset from and extending outwardly of the shaft 12. The spring washer 23 is biased as to resiliently urge the male element 22 against and in firm engagement with the female element 21 so that the teeth 22A may enter into the notches 21B, respectively, upon rotation of the male element 22, rotating with the shaft 12, in one circumferential direction, However, the resilient bias of the spring washer 23 is such that upon the shaft 12 being rotated in an opposite circumferential direction, the spring washer 23 resiliently yields sufficiently to permit the teeth 22A to ride up out of, in a camming manner, the respective notches 21B. Thus upon rotation of the shaft 12 in one rotative direction the wheel 15 will be rotatively driven in the same circumferential direction. Upon rotation of the shaft 12 in an opposite circumferential direction, then the teeth 22A become dis-engaged from the notches 21B and the driving interengagement between the elements 21 and 22 is terminated. In this condition the wheel 15 may be referred to as free-wheeling or non-driven.

This means that an operator of a device such as a tricycle may cause the device such as a tricycle to be driven forwardly by manually rotating the shaft 12 through the crank arms 13 and pedals 14. However, upon discontinuing such forward rotative action of the shaft 12 in the described manner, the wheel 15 non-rotatively secured to the shell 16 is free of driving engagement and may freely coast while the shaft 12 is either held stationary or rotated in a reverse direction.

It will be appreciated that the unit here disclosed is readily adaptable for many means and provides an economical, safe and efficient means for obtaining a good ratchet drive between a driving member and a driven member.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A ratchet drive mechanism for the driving of a rotative driven member concentrically mounted on a driving member extending axially through the driven member, comprising the combination of an annular metal shell, a bearing assembly carried by the shell and mountable concentrically on said driving member and within said driven member, a male ratchet driving element, a female ratchet driving element in axial alignment and in opposed interengageable relationship with said male ratchet driving element, a first of said elements being nonrotatively carried by said driving member and a second of said elements being carried by said shell, a spring member carried by said driving member and operatively engaging said first of the elements to resiliently bias it toward and into driving engagement with the second of said elements, the second of said elements carrying projecting means extending therefrom and said shell being interlockingly engaged with said projecting means to lock said second of the elements against rotation relative to the shell, the arrangement providing for the ratchet driving of the shell and driven member carried thereby in one rotative direction by the interengaged male and female ratchet elements upon the first of the elements being rotated by the driving member rotating in said one rotative direction, and for the slipping non-driving of the shell and driven member carried thereby upon the disengagement of said elements in opposition to the resilient bias of said spring member upon rotation of the driving member in an opposite rotative direction.

2. A ratchet drive mechanism as claimed in claim 1 and in which the male ratchet driving element is non-rotatively mounted on said driving member, and in which said spring member is a cupped spring washer anchored on said driving member and concentric therewith, said washer having its outer peripheral edge portion engaging said male ratchet driving element to resiliently press the same axially toward said female ratchet driving element.

3. A ratchet drive mechanism as claimed in claim 1 and in which said interlockment of the shell and the projecting means carried by the second of said elements is provided by the metal rim of the shell peened toward the said second element about said projecting means.

4. A ratchet drive mechanism adapted to be mounted concentrically upon a rotative driving member and within the hub of a rotative driven member to provide driving of the driven member in only one rotative direction by the driving member, comprising in combination an annular metal cup having an axial opening therethrough for accommodating said driving member, a ball bearing assembly carried by said cup to provide bearing support of one of said driving and driven members by the other, said cup having a rim portion at one axial end thereof, a female ratchet driving element carried by said cup concentrically thereof adjacent said ball bearing assembly, said rim portion of the cup being rolled inwardly over the edge of the female ratchet driving element to retain the same, a male ratchet driving element adapted to be non-rotatively and concentrically mounted on said driving member, said male ratchet driving element being disposed in opposition to said female ratchet driving element for engaging and rotatively driving the female ratchet driving element in one rotative direction upon rotation of the male ratchet driving element by the driving member in said one rotative direction, and a spring washer adapted to be concentrically mounted on and to abut said driving member in position to bear resiliently against said male ratchet driving element to resiliently urge it into driving engagement with said female ratchet driving element upon rotation of the driving member and male ratchet driving element in one rotative direction and to permit said male ratchet driving element to move axially out of driving engagement with said female ratchet driving element upon rotation of said driving member and male driving element in an opposite rotative direction.

5. A ratchet drive mechanism as claimed in claim 4 and in which said female ratchet driving element has spur portions extending outwardly therefrom about the peripheral edge portion thereof, and in which said rim portion of the cup is peened about said spur portions to interlock the cup and female ratchet driving element against rotative movement therebetween.

6. A ratchet drive mechanism as claimed in claim 5 and in which said female ratchet driving element is disposed within said cup radially outward of the inner race of said ball bearing assembly, and in which said male ratchet driving element while in driving engagement with the female ratchet driving element abuts said inner race of the ball bearing assembly and while out of driving engagement with said female ratchet driving element is spaced axially from said inner race.

7. A ratchet drive mechanism for mounting on a driving shaft and within the hub of a driven wheel, the shaft having abutting means provided at a location therealong, said mechanism comprising a ball bearing assembly having its inner race non-rotatively and concentrically mounted on said shaft at an axial distance from said abutting means, an outer race concentrically mounted on said inner race and separated therefrom by a plurality of ball bearings, a metal cup member carrying said outer race and adapted to be non-rotatively mounted in said hub in non-rotative engagement therewith, said cup member at one axial end extending radially about said outer race at one axial side thereof and having a rim portion extending around the cup member at the opposite axial end thereof, a female ratchet drive element disposed in said cup member adjacent said outer race and secured within said cup member by said rim portion overlapping the outer peripheral edge portion of the female ratchet drive element, a male ratchet drive element adapted to be concentrically and non-rotatively mounted in said shaft next adjacent said inner race and disposed to face said female ratchet drive element for driving engagement therewith, said male ratchet drive element being axially movable on said shaft toward and away from said female ratchet drive element, and a spring member adapted to be concentrically mounted on said shaft intermediate said abutting means and said male ratchet drive element to abut against said abutting means and to resiliently bias said male ratchet drive element axially toward said female ratchet drive element and into driving engagement therewith, said elements upon being interengaged causing the female element, cup member and wheel to be driven in one rotative direction upon said shaft and male element being rotated in said one rotative direction, said elements upon being disengaged permitting free wheeling of said female element, cup member and wheel upon said shaft and male element being rotated in an opposite rotative direction.

8. A ratchet drive mechanism as claimed in claim 7 and in which said rim portion of the cup member and said female ratchet drive element have interlocked portions resisting relative rotative movement between the cup member and female ratchet drive element.

9. A ratchet drive mechanism as claimed in claim 8 and in which said interlocking of rim portion and female ratchet drive element is provided by spur portions extending outwardly from the female ratchet drive element and by metal of the rim portion peened about the spur portions.

10. A ratchet drive mechanism as claimed in claim 9 and in which said spring member is a cupped spring washer having its inner peripheral edge portion positioned to abut said abutting means on the shaft and having its outer peripheral portion positioned to bear against said female ratchet drive element.

* * * * *